United States Patent
Khan et al.

(10) Patent No.: US 10,481,247 B2
(45) Date of Patent: Nov. 19, 2019

(54) METHOD, AN APPARATUS AND A COMPUTER PROGRAM PRODUCT FOR POSITIONING

(71) Applicant: HERE GLOBAL B.V., Eindhoven (NL)

(72) Inventors: Muhammad Irshan Khan, Tampere (FI); Jari Syrjärinne, Tampere (FI); Pavel Ivanov, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/537,720

(22) PCT Filed: Dec. 19, 2014

(86) PCT No.: PCT/EP2014/078650
§ 371 (c)(1),
(2) Date: Jun. 19, 2017

(87) PCT Pub. No.: WO2016/096029
PCT Pub. Date: Jun. 23, 2016

(65) Prior Publication Data
US 2018/0275261 A1    Sep. 27, 2018

(51) Int. Cl.
*H04W 24/00* (2009.01)
*G01S 11/06* (2006.01)
(Continued)

(52) U.S. Cl.
CPC ............ *G01S 11/06* (2013.01); *G01S 5/02* (2013.01); *G01S 5/0205* (2013.01); *H04W 4/02* (2013.01);
(Continued)

(58) Field of Classification Search
CPC ....... H04W 4/02; H04W 4/029; H04W 8/245; H04W 88/03; H04L 29/08657;
(Continued)

(56) References Cited

U.S. PATENT DOCUMENTS 8,532,676 B1 *  9/2013  El-Sallabi ............. H04W 64/00
                                                    455/456.5
8,538,442 B1 *  9/2013  Ettinger .............. H04W 40/244
                                                    455/446
(Continued)

FOREIGN PATENT DOCUMENTS

WO   WO 2006/067339 A1   6/2006
WO   WO 2012/038779 A1   3/2012
WO   WO 2015/197107      12/2015

OTHER PUBLICATIONS

International Search Report and Written Opinion from International Application No. PCT/EP2014/078650, dated Sep. 2, 2015, 11 pages.
(Continued)

*Primary Examiner* — Danh C Le
(74) *Attorney, Agent, or Firm* — Alston & Bird LLP

(57) ABSTRACT

The invention relates to determination of a location of a device of a user. In a methods, information of signal strength of one or more wireless signals and information of signal strength distribution of wireless signals is obtained by a device. The information of signal strength and the information of signal strength distribution are used to determine at least one likelihood whether the device is inside an area. In the method radio maps representing signal strength distribution in the building may be used.

21 Claims, 7 Drawing Sheets

(51) Int. Cl.
  *G01S 5/02* (2010.01)
  *H04W 4/02* (2018.01)
  *H04M 1/725* (2006.01)
(52) U.S. Cl.
  CPC ....... *G01S 5/0252* (2013.01); *H04M 1/72519* (2013.01); *H04M 1/72522* (2013.01)
(58) Field of Classification Search
  CPC ......... H04M 1/72519; H04M 1/72522; H04M 1/72525; G01S 1/08; G01S 5/00
  USPC ......... 455/456.1, 456.6, 418, 550.1; 342/386
  See application file for complete search history.

(56) References Cited

U.S. PATENT DOCUMENTS

| | | | | |
|---|---|---|---|---|
| 9,204,251 | B1* | 12/2015 | Mendelson | G08G 1/14 |
| 9,584,966 | B1* | 2/2017 | Thiel | H04W 4/02 |
| 2005/0185618 | A1 | 8/2005 | Friday et al. | |
| 2012/0028649 | A1 | 2/2012 | Gupta et al. | |
| 2013/0157638 | A1* | 6/2013 | Malmbak | H04W 4/043 |
| | | | | 455/418 |
| 2013/0162471 | A1* | 6/2013 | Suzuki | G01S 19/39 |
| | | | | 342/357.43 |
| 2014/0002207 | A1 | 1/2014 | Liu et al. | |
| 2014/0002307 | A1* | 1/2014 | Mole | G01S 5/0263 |
| | | | | 342/451 |
| 2014/0171107 | A1* | 6/2014 | Kao | G01C 21/206 |
| | | | | 455/456.1 |
| 2014/0179298 | A1 | 6/2014 | Grokop et al. | |
| 2014/0192658 | A1* | 7/2014 | Venkatraman | G01S 19/14 |
| | | | | 370/252 |
| 2014/0253371 | A1 | 9/2014 | Chen et al. | |
| 2014/0253386 | A1* | 9/2014 | Sun | G01S 5/021 |
| | | | | 342/387 |
| 2014/0274116 | A1* | 9/2014 | Xu | G01S 11/06 |
| | | | | 455/456.1 |
| 2015/0002264 | A1 | 1/2015 | Kitahara et al. | |
| 2015/0039269 | A1 | 2/2015 | Mejegard et al. | |
| 2015/0281908 | A1* | 10/2015 | Venkatraman | H04W 4/04 |
| | | | | 455/456.6 |
| 2015/0341233 | A1* | 11/2015 | Marri Sridhar | H04W 4/70 |
| | | | | 370/252 |
| 2016/0014554 | A1 | 1/2016 | Sen et al. | |
| 2016/0080911 | A1* | 3/2016 | Kay | H04W 4/04 |
| | | | | 455/456.1 |
| 2016/0155088 | A1 | 6/2016 | Pylappan et al. | |
| 2016/0161592 | A1 | 6/2016 | Wirola et al. | |
| 2016/0247480 | A1 | 8/2016 | Li et al. | |
| 2017/0097258 | A1* | 4/2017 | Albadawi | A61B 5/1112 |
| 2017/0292728 | A1 | 10/2017 | Ushirosako et al. | |

OTHER PUBLICATIONS

International Preliminary Report on Patentability from International Application No. PCT/EP2014/078650, dated Jun. 29, 2017, 9 pages.
Office Action for U.S. Appl. No. 16/523,405 dated Aug. 16, 2019.

* cited by examiner

METHOD, AN APPARATUS AND A COMPUTER PROGRAM PRODUCT FOR POSITIONING

FIELD OF THE INVENTION

The present embodiments relate generally to determination of a location of a device of a user. In particular, the present embodiments relate to a method for determining a location of a device, an apparatus for the location determination and computer program code to implement the determination of a location of a device.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Positioning technologies which are used mainly outdoors, such as satellite positioning systems (global navigation satellite systems, GNSS such as global positioning system GPS, GLONASS, Galileo) and cellular positioning technologies, may not deliver such a performance indoors that would enable seamless and equal navigation experience in both outdoors and indoors. The positioning accuracy of a couple of meters, coverage and floor detection are challenging to achieve with satisfactory performance levels with the systems and signals that were not designed and specified for the indoor use cases in the first place. Satellite-based radio navigation signals may not penetrate through the walls and roofs of many buildings strongly enough for the adequate signal reception and the cellular signals may have too narrow bands for accurate ranging by default.

Some indoor-dedicated solutions are based on so called pseudolites (GPS-like short-range beacons), ultra-sound positioning, Bluetooth® low energy (BTLE) signals and wireless local area network (WLAN) fingerprinting.

Outdoor and indoor positioning technologies may complement each other. On the one hand, the satellite positioning systems may provide accurate outdoor positioning in open sky but may start to degrade when a user comes closer to a building. On the other hand, indoor positioning technologies may provide accurate positioning, usually better than satellite positioning systems, inside buildings and in the vicinity of the buildings and degrade when a user goes away from the building.

SUMMARY OF THE INVENTION

Various embodiments of the invention include a semiconductor chip, a method, an apparatus, and a computer readable medium comprising a computer program stored therein, which are characterized by what is stated in the independent claims. Various embodiments of the invention are disclosed in the dependent claims.

According to a first example, a method comprises
obtaining information of signal strength of one or more wireless signals by a device;
obtaining information of signal strength distribution of wireless signals; and
using the information of signal strength and the information of signal strength distribution to determine at least one likelihood whether the device is inside an area.

According to a second example, an apparatus comprises at least one processor, memory including computer program code, the memory and the computer program code configured to, with the at least one processor, cause the apparatus to perform at least the following:
obtain information of signal strength of one or more wireless signals by a device;
obtain information of signal strength distribution of wireless signals; and
use the information of signal strength and the information of signal strength distribution to determine at least one likelihood whether the device is inside an area.

According to a third example, a computer program product embodied on a non-transitory computer readable medium, comprises computer program code configured to, when executed on at least one processor, cause an apparatus or a system to:
obtain information of signal strength of one or more wireless signals by a device;
obtain information of signal strength distribution of wireless signals; and
use the information of signal strength and the information of signal strength distribution to determine at least one likelihood whether the device is inside an area.

According to a fourth example, an apparatus comprises:
means for obtaining information of signal strength of one or more wireless signals by a device;
means for obtaining information of signal strength distribution of wireless signals; and
means for using the information of signal strength and the information of signal strength distribution to determine at least one likelihood whether the device is inside an area.

According to a fifth example, a system comprises at least:
a device for obtaining information of signal strength of one or more wireless signals;
one or more radio maps comprising information of signal strength distribution of wireless signals; and
a likelihood estimator adapted for using the information of signal strength and the information of signal strength distribution to determine at least one likelihood whether the device is inside an area.

DESCRIPTION OF THE DRAWINGS

In the following, various embodiments of the invention will be described in more detail with reference to the appended drawings, in which.

DETAILED DESCRIPTION OF THE INVENTION

Figure 2:
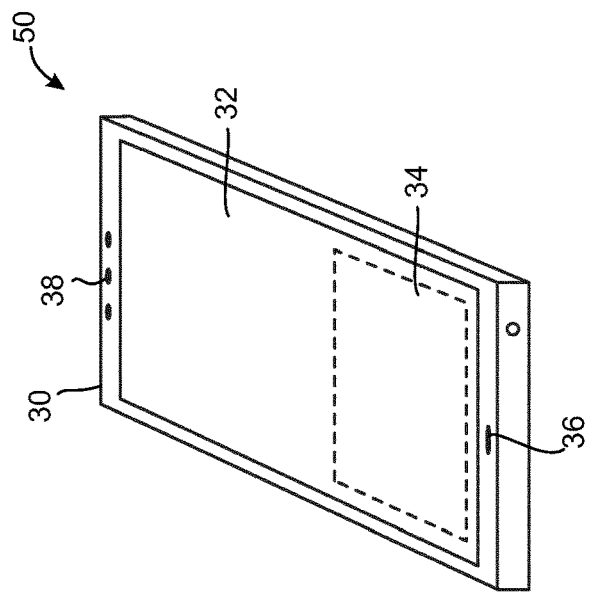
FIG. 2 shows a layout of an apparatus according to an embodiment.
Figure 1:
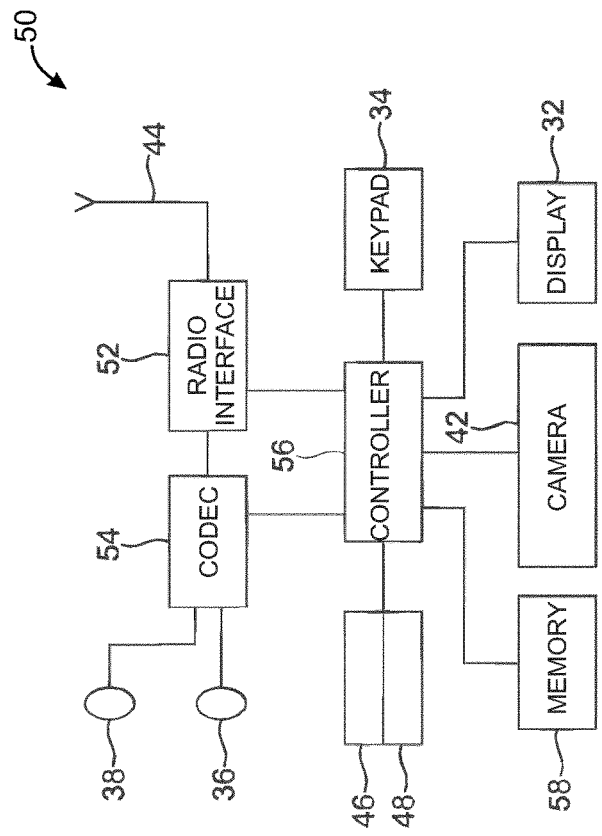
FIG. 1 shows an apparatus according to an embodiment.

FIGS. 1 and 2 illustrate an apparatus according to an embodiment. The apparatus 50 is an electronic device, for example a mobile terminal or a user equipment of a wireless communication system (e.g. a cellular phone, a personal digital assistant (PDA), a smartphone, a tablet computer or the like), a camera device, etc. The embodiments disclosed in this application can be implemented within any electronic device or apparatus which is able to receive wireless signals and perform positioning or assisting in the positioning. The electronic device or apparatus may be connectable to a network. The apparatus 50 may comprise a housing 30 for incorporating and protecting the device. The apparatus 50 further may comprise a display 32, for example, a liquid crystal display or any other display technology capable of displaying images and/or videos. The apparatus 50 may further comprise a keypad 34. According to another embodiment, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device, which may be any of the following: an earpiece 38, a speaker or an analogue audio or digital audio output connection. The apparatus 50 may also comprise a battery (according to another embodiment, the device may be powered by any suitable mobile energy device, such as solar cell, fuel cell or clockwork generator). The apparatus may comprise a camera 42 capable of recording or capturing images and/or video, or may be connected to one. According to an embodiment, the apparatus 50 may further comprise an infrared port for short range line of sight communication to other devices. According to an embodiment, the apparatus 50 may further comprise any suitable short range communication solution such as for example a Bluetooth wireless connection or a USB/firewire wired solution.

The apparatus 50 may comprise a controller 56 or processor for controlling the apparatus. The controller 56 may be connected to memory 58 which, according to an embodiment, may store both data in the form of image and audio data and/or may also store instructions for implementation on the controller 56. The controller 56 may further be connected to codec circuitry 54 suitable for carrying out coding and decoding or audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

Figure 3:
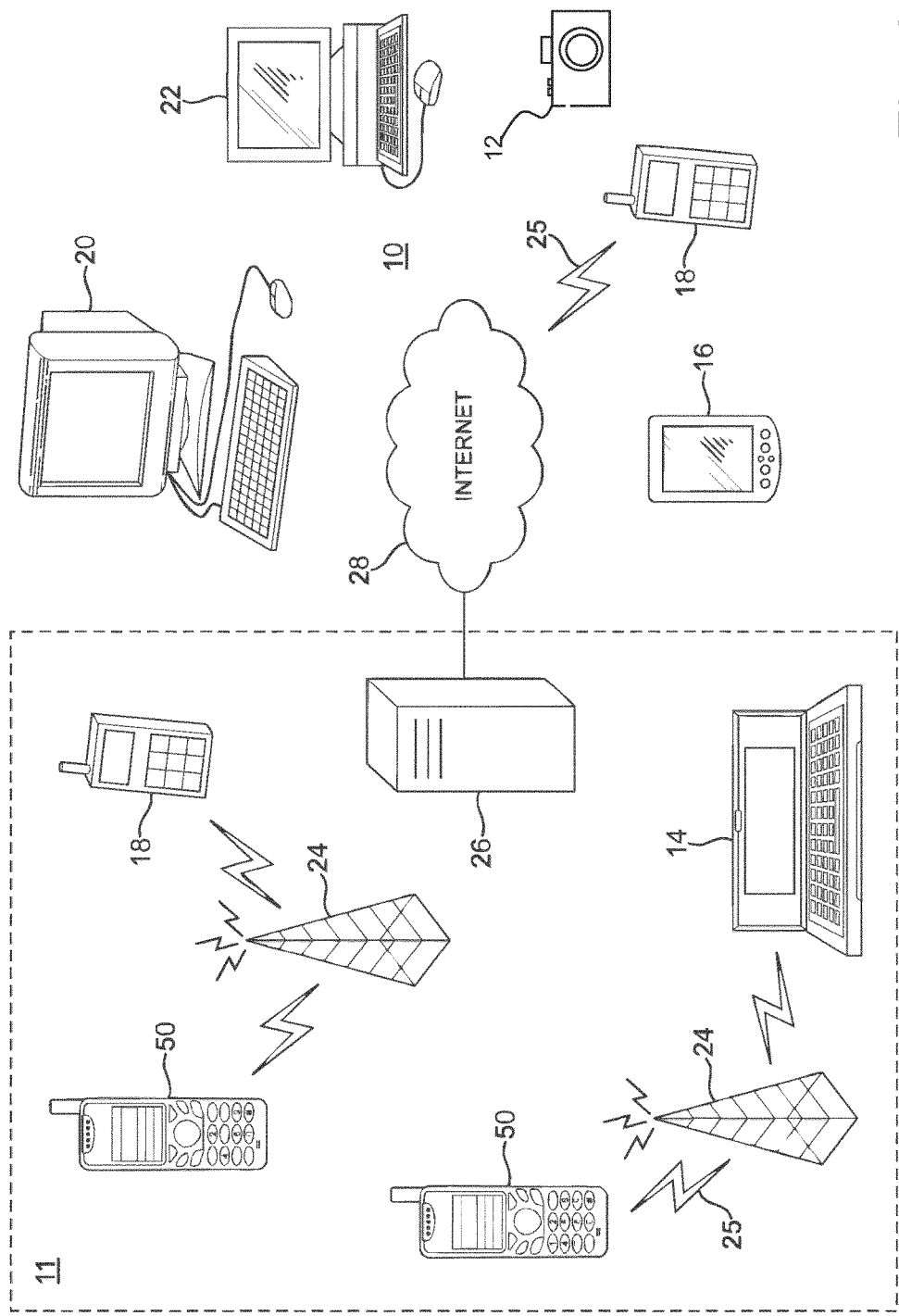
FIG. 3 shows a system according to an embodiment.

FIG. 3 shows a system configuration comprising a plurality of apparatuses, networks and network elements according to an embodiment. The system 10 comprises multiple communication devices which can communicate through one or more networks. The system 10 may comprise any combination of wired or wireless networks including, but not limited to a wireless cellular telephone network (such as a GSM, UMTS, CDMA network, etc.), a wireless local area network (WLAN), such as defined by any of the IEEE 802.x standards, a Bluetooth personal area network, an Ethernet local area network, a token ring local area network, a wide area network, and the internet.

The system 10 may include both wired and wireless communication devices or apparatus 50 suitable for implementing present embodiments. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a digital camera 12. The apparatus 50 may be stationary or mobile when carried by an individual who is moving. The apparatus 50 may also be located in a mode of transport.

Some of further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telephone system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio infrared, laser, cable connections or any suitable connection.

Figure 4B:
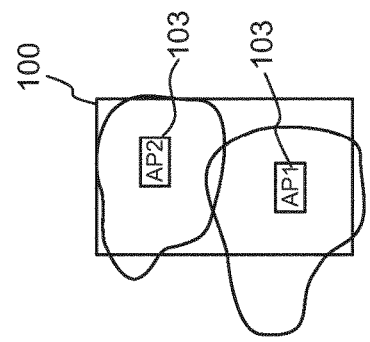
FIG. 4b illustrates an example of a coverage area of two access points.

In the following an example embodiment for obtaining information for radio maps for buildings is disclosed in more detail with reference to FIGS. 4a, 4b and 5. The radio maps may also be called as coverage maps or service area diagrams in this specification.

Figure 4A:
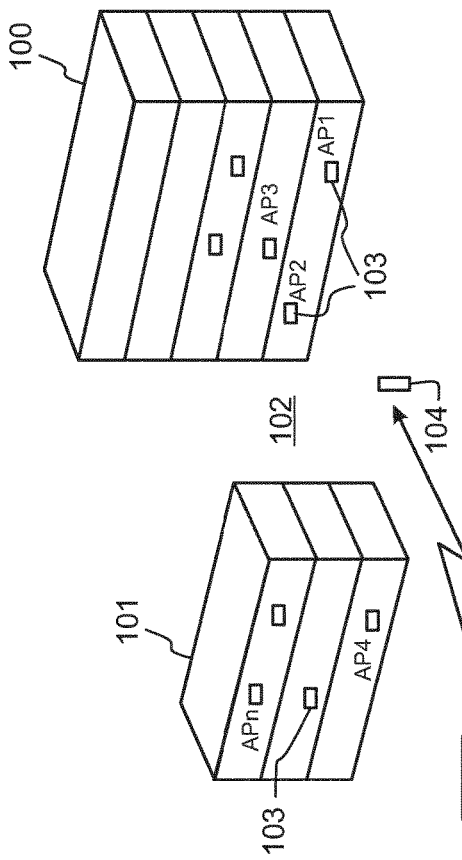
FIG. 4a illustrates a simplified environment with two buildings.
Figure 5:
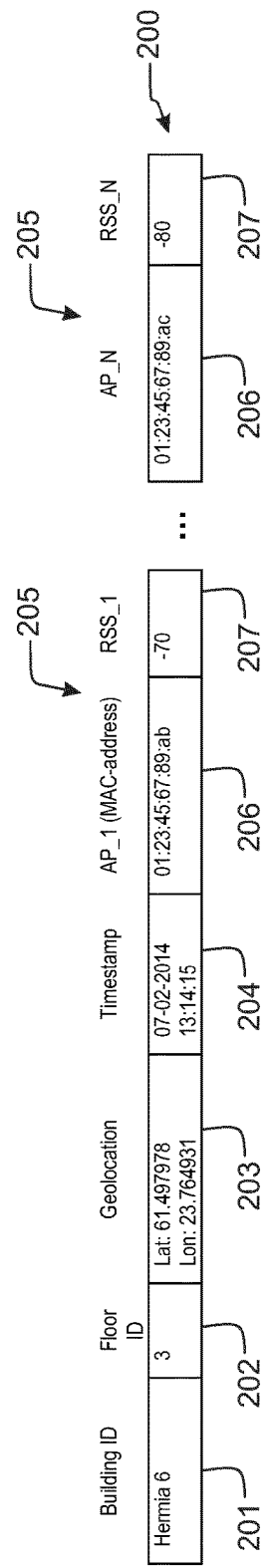
FIG. 5 illustrates an example of the data packet.

FIG. 4a illustrates a simplified environment where two buildings 100, 101 are located and there is some outdoor space 102 around these buildings 100, 101. In this non-limiting example, the first building 100 has five floors and the second building 101 has three floors. It should be noted, however, that these are only examples and the actual number of buildings, floors etc. may vary in different environments.

Radio maps may be formed by utilising results of several signal strength measurements in the environment. For example, an administrator of a system may use a device 104 which is able to measure signal strengths of wireless transmission stations, such as access points 103 (AP_1, . . . AP_n) located inside the buildings 100, 101. Signal strength may be measured e.g. as follows. The communication interface 322 of the device 300 may comprise a radio front end 330, which may be used to receive wireless (radio) signals. The radio front end 330 is depicted in FIG. 7b as a simplified block diagram, in accordance with an embodiment. The received radio signals may pass through a band pass filter 332 and a down converter 334 to convert the received radio signals to intermediate frequency signals or to base band signals. The amplitude of the converted signal may be converted to digital values e.g. by an analog-to-digital converter 336. The digital values may then be used to calculate e.g. the power of the received signal. The calculations may be performed e.g. by the RSSI measurement element 322. This power value may thus be indicative of the received signals strength. In accordance with an embodiment, the device 300 may be able to indicate the measured signal strength values as so called RSSI values (received signal strength indicator).

Radio maps may comprise a kind of grid points, which may have been formed on the basis of measured signal strength values. Grid points may be associated with identification information and position information of the grid point. For example, a grid point may be associated with a building id, a floor id, latitude and longitude, access point id, etc. Different observed (measured) signal strength values may represent different grid points. However, if two or more signal strength values have been measured at the same or almost the same location, those measurement values may be combined to represent one grid point. The combination may be e.g. an average or a mean of the measurement values. It may also be possible that two or more grid points may be located at the same location but representing signal strength values of different access points.

Figure 11:
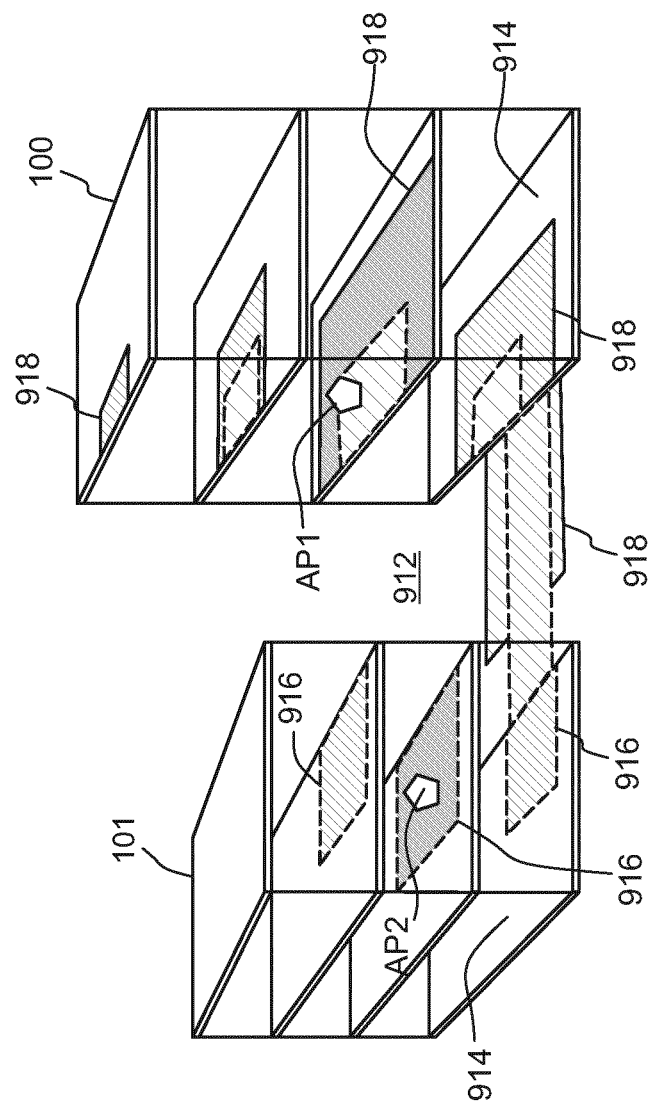
FIG. 11 illustrates as a simplified 3-dimensional view an example of radio images of access points associated with two buildings.

FIG. 11 illustrates an example of signal strengths of access points associated with two buildings as a simplified 3-dimensional view. In this example a first access point AP1 is located in the first building 100 and a second access point AP2 is located in the second building 100. The squares 916, 918 illustrate signal strength distributions of the access points at different locations. These signal strength distributions may also be called as radio images. In this example, the signal of the second access point AP2 may be received, not only at several floors of the second building 101, but also in an outdoors area 914 between the two buildings 100, 101 and further in some locations inside the first building 100. Respectively, the signal of the first access point AP1 may be received, not only at several floors of the first building 100, but also in the outdoors area 914 between the two buildings 100, 101. The rectangles having solid edges illustrate signal strength distributions of the first access point AP1 and the rectangles having dotted edges illustrate signal strength distributions of the second access point AP2. The density of the hash lines within the rectangles 916, 918 illustrate signal strength distribution so that denser hash lines illustrate greater signals strength than less denser hash lines. It should be noted, however, that in practical situations the signal strength distribution may not be occurring as rectangles but in more variable form, and further, although the hash line density is constant within the rectangles 916, 918 of FIG. 11, signal strength may not be constant within that area.

The access points may be any type/kind of a transmitter, e.g. WiFi, Bluetooth®, Bluetooth Low Energy (BLE), Cellular Station, Pseudolite Digital TV, etc., that makes it possible to measure/calculate the likelihood of the signal strength.

The device 104 may also be able to determine the location of the device at some accuracy, or the user of the device may enter the location to the device 104. When the device has scanned a predetermined frequency range to find out which access points 103 are available at the current location of the device 104 and the signal strengths of the access points 103 at that location, the device 104 may form a data packet 200 of these measurement results and send it to a server 105, for example. FIG. 5 illustrates an example of the data packet 200. The data packet 200 may comprise a building identifier 201, indication 202 of the floor of the building where the device is currently located, a geographical location 203 of the device (e.g. latitude and longitude), a time stamp 204 of the measurement, and one or more records 205 including an identifier 206 of an access point 103 and the measured signal strength value 207 of the access point 103. For example, if the device 104 is able to receive signals from eight different access points at the current location, the data packet 200 may include eight data records 205, one for each access point. When the device is moved to another location in the building, the above mentioned steps may be repeated and new data packet(s) 200 may be formed and sent to the server 105, respectively.

In accordance with an embodiment the identifier 206 of an access point may be an identifier which is unique for each access point. An example of such identifier is a media access control address (MAC address), but also other identifiers may be used which are able to differentiate access points from each other.

In accordance with an embodiment the same identifier 206 of an access point may be used for different access points, if they are distant from each other.

The above described measurements may be repeated in many different locations of the device in the building and by many different devices so that a large amount of measurement results will be available. The measurements may also be performed outside of the building wherein the data packet may also indicate that the measurements are performed outside the building. In addition to or alternatively, the server 105 may have information on the structure of the building (e.g. the location of the walls of the building etc.), wherein the geolocation information may be used to reveal whether the measurement has been made inside or outside the building.

The radio maps may be obtained on the basis of the measurement results e.g. so that a range in which signals of an access point can be received is determined and the signal strength of that access point at certain locations (e.g. at the measurement points). This range may also be called as a coverage area or a service area of the access point. FIG. 4b illustrates an example in which the coverage area of two access points AP_1, AP_2 are depicted.

In accordance with an embodiment, in addition to or instead of the server 105, the device 104 may form the radio maps and store them into the memory of the device and/or to send them to the server 105.

It may also be possible that the measurements are performed after forming the radio map(s) wherein the radio map(s) may be updated on the basis of the measurements, wherein the reliability and/or the accuracy of the radio map(s) may be improved as well.

In other words, the observed received signal strength measurements (RSS) may be utilized to obtain information of signal strength distribution of access points of the building and to form 2-dimensional radio maps and is hereby able to capture the dynamics of the indoor radio propagation environment.

It may also be possible that large volumes of indoor signal strength measurements data could be harvested via crowdsourcing if the consumer devices were equipped with the necessary functionality to enable the signal strength data collection e.g. as a background process, perhaps only with the end-user consent. It could also be possible to use volunteers to survey the sites (buildings) and get the coverage climbing up globally in the places and venues popular with people.

In accordance with an embodiment, several radio maps may be formed for one building. For example, one radio map may be formed for each floor of the building. There may also be one or more outdoor radio maps. In other words, a coverage area of some access points may also comprise some areas outside of a building. Hence, such areas may be presented in one or more outdoor radio maps, or such areas may be regarded to represent a virtual outdoor building.

Signals of some access points of a building may also be receivable in more than one floor of the building, and/or in more than one building, for example in one or more floors above and/or below the floor where the access point is located and/or in two buildings in proximity to each other. Hence, that access point may be represented in more than one radio map.

Figure 6:
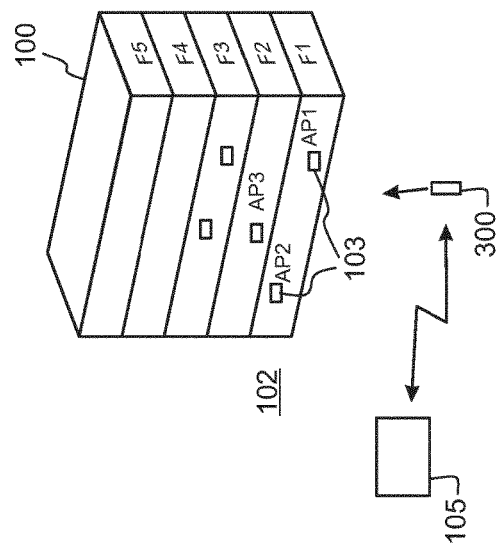
FIG. 6 shows an example situation in which a user is approaching a building.

In the following utilization of the radio maps is explained in accordance with an embodiment and with reference to FIGS. 6, 7a and 8. It is assumed that a user is approaching the first building 100 of FIG. 6 and he carries a device 300 capable of receiving signals of a wireless local area network (WLAN, e.g. WiFi™), a Bluetooth® beacon and/or another access point 103 located inside the first building 100. A signal strength measurement element 302 (FIG. 7a) of the device 300 may perform scanning a certain frequency range to determine whether the device 300 is in a coverage range of one or more access points 103 in the neighbourhood (Block 802 in FIG. 8). If the signal strength measurement element 302 detects signals of one or more access points 103, the signal strength measurement element 302 examines the identity of available access points 103 (block 804) and measures the signal strength. A radio map analyser 304 may examine whether the device 300 has one or more radio maps in the memory in which coverage range information of that access point can be found (block 806). If one or more such radio maps exist in the memory, the radio maps can be examined 808 e.g. by a building determination element 306. On the other hand, if the examination reveals that there are not any radio maps associated with that particular access point, the device 300 may request 810 such map from the server 105, for example. If the radio map is available to the server 105, the server 105 may send that radio map to the device 300. If no radio maps associated with the access point are available, the device 300 may ignore that access point from further analyses and try to use one or more other access points the signals of which the device 300 is able to receive.

The signal strength measurements may be represented e.g. as radio scan report(s) comprising, for example, indication of the measured access point(s) and the measured signal strengths of the access point(s). It should, however, be noted that there are many different methods to inform the signal strength measurement results to further analyses.

The radio scan report can be examined to find out which access points have been heard by the device 300. Then, the radio map(s) can be examined to find out in which radio map(s) the access points are represented, wherein such radio maps can be used in evaluating whether the device 300 may be located inside or outside the building, and possibly in which floor of the building the device 300 may be located. To perform the evaluation a building determination element 306 may use information on the identities of the access points and corresponding access point information of the radio maps to obtain a probability or some other value indicative of whether the device 300 is at the location associated with the radio map or not. For example, if the radio scan report reveals that the device 300 has been able to measure signal strength of a first access point AP1, a second access point AP2 and a third access point AP3, and if a first radio map indicates that a first access point AP1 and a second access point AP2 cover at least a first floor F1 of a first building 100, it may be deduced that there is a possibility that the device 300 might be located in the first floor of the first building. If a second radio map indicates that the first access point AP1 and the third access point AP3 cover at least a second floor F2 of the first building 100, it may also be deduced that there is a possibility that the device 300 might be located in the second floor of the first building. Furthermore, there may also be the outdoor radio map indicating e.g. that the first access point AP1 covers an area outside the first building, wherein the building determination element 306 may also deduce that the device 300 may be located outside the first building 100.

The results obtained by the building determination element 306 may be provided to a buildings likelihood estimator 308. The buildings likelihood estimator 308 may calculate 812 different likelihoods to different options. For example, the buildings likelihood estimator 308 may calculate the likelihood that the device 300 is in the first floor of the first building, the likelihood that the device 300 is in the second floor of the first building, and the likelihood that the device 300 is outside of the first building. The likelihood calculation may be based on e.g. the number of matched (measured) access points, a sum of received signal strength differences, and possibly using some weights in the calculations.

Figure 7A:
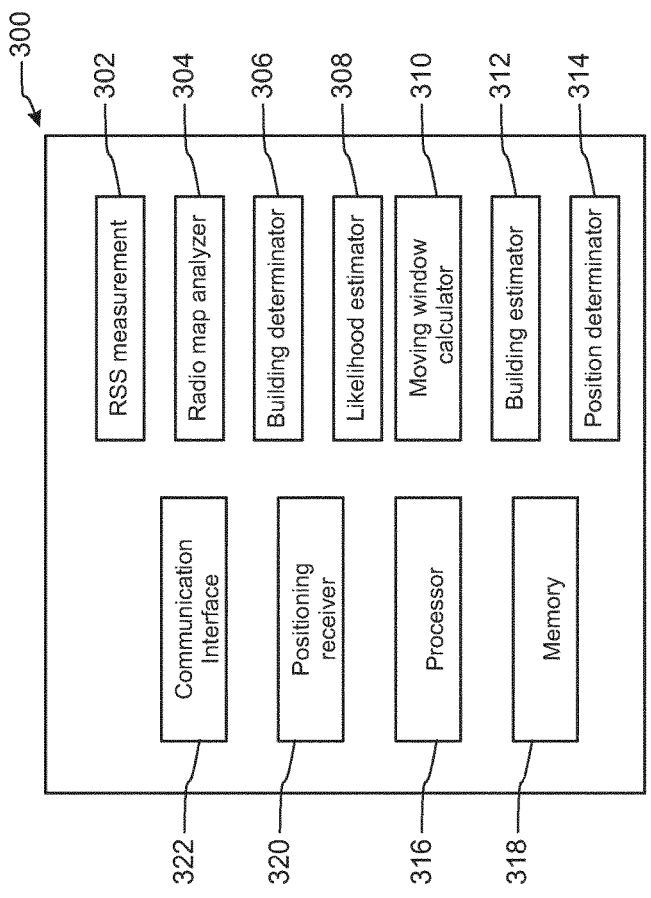
FIG. 7a shows an example of an apparatus, in accordance with an embodiment.
Figure 7B:
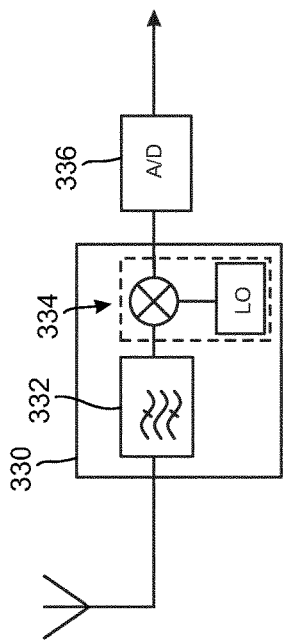
FIG. 7b shows an example of a radio frequency front end of the apparatus, in accordance with an embodiment.
Figure 8:
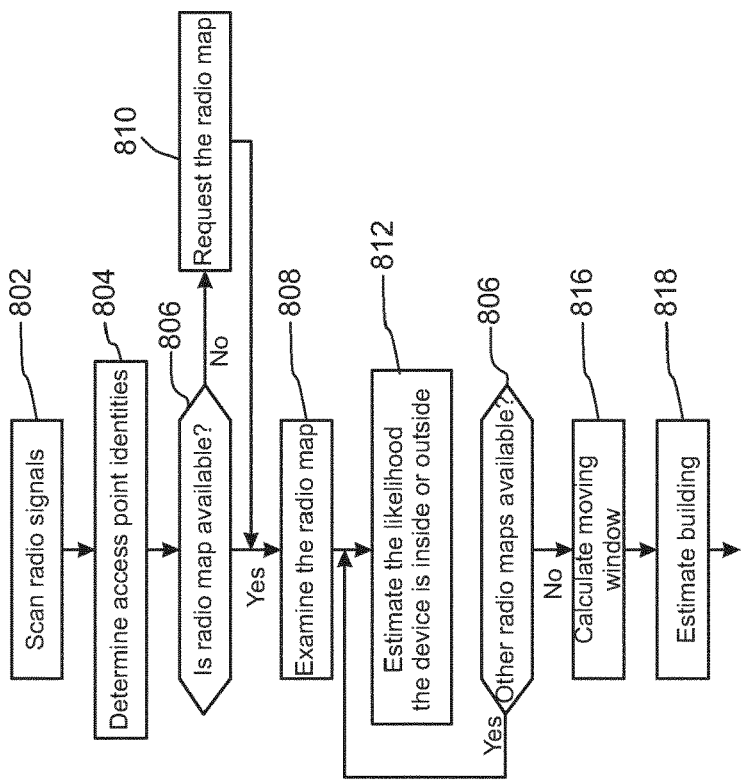
FIG. 8 illustrates an embodiment of a method as a flowchart.

FIG. 7a also depicts some other parts, which the device 300 may have, but in practical implementations some of these parts may not be present and/or the device 300 may have some further equipment not shown in FIG. 7a. The processor 316 may take care of controlling the operation of the device 300 or some parts of the device 300. The memory 318 may be used to store information, program code and/or other data. The communication interface 322 may be used to communicate with other devices, such as with the server 105, with the access points 103, etc. The positioning receiver 320 may utilize signals from positioning satellites, signals of wireless local area network, signals of a cellular network, and/or some other signals in determining the location of the device 300. For example, the determination whether the device 300 is indoors or outdoors, may be used to control the positioning receiver 320 to use appropriate positioning equipment (indoors/outdoors positioning).

It should also be noted here that some of the blocks 302 to 314 may be implemented as separate circuitry or as a program code of the processor 316 or both.

Figure 9:
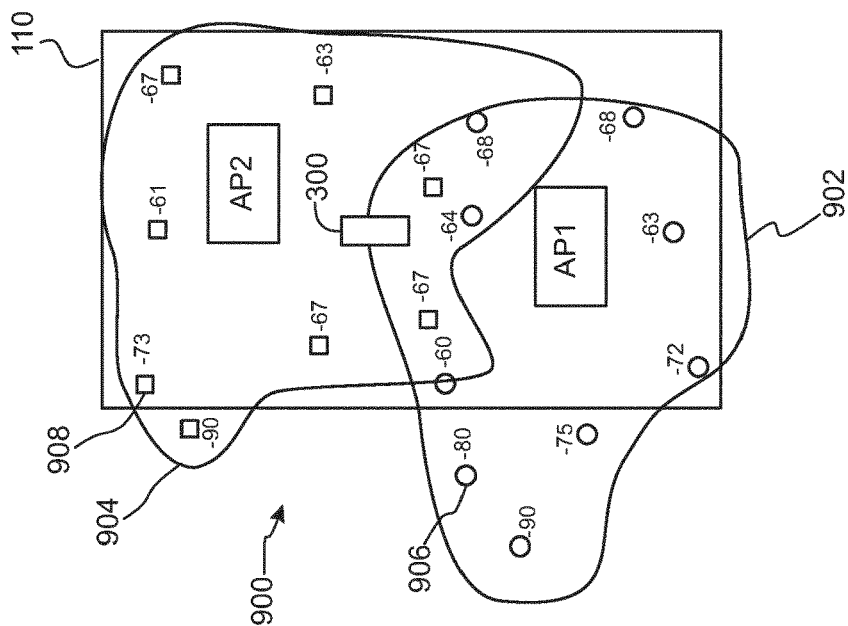
FIG. 9 illustrates an example of measurement data of a radio map.

In the following an example of the calculation of the sum of received signal strength differences is depicted in more detail with reference to FIG. 9. FIG. 9 illustrates an example of a radio map 901 in which a coverage area 902 of the first access point AP1 is depicted and some measurement points (circles 906) and their associated signal strength measurement values (e.g. in dBm), and, respectively, a coverage area 904 of the second access point AP2 is depicted and some measurement points (squares 908) and their associated signal strength measurement values (in dBm). FIG. 9 also shows outer walls 110 of the building 100 and, as an example, a location in which the device 300 might be located when the building determination is performed. The buildings likelihood estimator 308 may calculate differences of the measured signal strength value of the first access point AP1 to some or all of the signal strength measurement values of the first access point AP1 associated with the measurement points of the first radio map and add these differences together. Similarly, the buildings likelihood estimator 308 may calculate differences of the measured signal strength value of the second access point AP2 to some or all of the signal strength measurement values of the second access point AP2 associated with the measurement points of the first radio map and add these differences together.

The value of the sums of differences may be used to determine the likelihood that the device is in the first floor FL1 of the first building 100. Furthermore, the number of matched access points may also be used together with the value of the sums of differences in the likelihood determination. In an embodiment, some weights may be used. For example, the value of the sums of differences may have more weight than the number of matched access points, or vice versa.

The operations described above may be repeated 814 to other radio maps as well to obtain likelihood values for each radio map (building) under examination. Then, the most probable value among the likelihood values may represent the estimation in which building (or outside) the device 300 is located.

In accordance with an embodiment, a moving window calculation element 310 may be used to combine 816 likelihood values using the so called moving window principle as explained in the following. The length of the moving window may be N samples, wherein N latest likelihood values shall be used in the calculation. The calculation may be repeated each time new signal strength measurement results are available. In other words, the moving window calculation element combines the likelihoods calculated based on latest and previous N−1 signal strength measurements. If the latest measurement was the first measurement then it may fill the other N−1 values with prior values. The moving window calculation element 910 may use e.g. the following equation in the calculation:

$$\text{Likelihood} = \frac{1}{N} * \sum_{i=1}^{N} \text{Likelihood\_vector}(i) * \text{Availability\_vector}(i) \quad (1)$$

where Likelihood_vector contains likelihood values of the buildings for previous N measurements, and Availability_vector indicates if buildings were presented in previous measurements or not. The availability vector may contain the value 0 or 1. The value '1' indicates that the building is heard in a measurement and the value '0' indicates that the building is not heard in a measurement. The factor 1/N in the equation is a normalization constant. In an embodiment the value of N may be 5, but also other values may be used instead.

A building estimator 312 may take the output of the moving window calculation element 310 and decide 818 the building of the device 300. One possibility to estimate the building is the selection of a building with the maximum likelihood value.

One example of building estimation is explained below. A simulated Likelihood_vector and Availability vector for buildings shown in FIG. 4a is presented in tables 1 and 2 respectively.

TABLE 1

Example of value in Buildings_likelihood_vector

| Measurement | 1 | 2 | 3 | 4 | 5 |
|---|---|---|---|---|---|
| Building 1 | 0.5 | 0.3 | 0.4 | 0.5 | 0.4 |
| Virtual Outdoor building | 0.2 | 0.4 | 0.3 | 0.4 | 0.5 |
| Building 3 | 0.3 | 0.0 | 0.2 | 0.2 | 0.0 |

TABLE 2

Example of values in Avalaibility_building_vector

| Measurement | 1 | 2 | 3 | 4 | 5 |
|---|---|---|---|---|---|
| Building 1 | 1 | 1 | 1 | 1 | 1 |
| Virtual Outdoor building | 1 | 1 | 1 | 1 | 1 |
| Building 3 | 1 | 0 | 1 | 1 | 0 |

Vectors of Buildings_likelihoods_vector and Availability_building_vector are used to obtain likelihood values of the building using the above equation. After calculating the Buildings_likelihood, the maximum likelihood value of a building may be used to determine the building of user. From the values in Table 1 and Table 2 and using Equation 1 (N=5), the likelihood values are as follows: Building 1=0.42; Virtual outdoor building=0.36; and Building 3=0.14. Hence, it can be estimated that user was in Building 1. Similarly outdoor building can be estimated when likelihood value of outdoor building is higher than the other building(s).

As another example, let us assume that the following likelihoods have been obtained on the basis of signal strength measurements and radio maps.

TABLE 3

Another example of value in Buildings_likelihood_vector

| Measurement | 1 | 2 | 3 | 4 | 5 |
|---|---|---|---|---|---|
| Building 1 | 0.1 | 0.2 | 0.4 | 0.2 | 0.4 |
| Virtual Outdoor building | 0.4 | 0.4 | 0.3 | 0.4 | 0.5 |
| Building 3 | 0.3 | 0.0 | 0.2 | 0.2 | 0.0 |
| Building 4 | 0.1 | 0.0 | 0.2 | 0.1 | 0.1 |
| Building 2 | 0.5 | 0.6 | 0.3 | 0.3 | 0.4 |

TABLE 4

Another example of values in Avalaibility_building_vector

| Measurement | 1 | 2 | 3 | 4 | 5 |
|---|---|---|---|---|---|
| Building 1 | 1 | 1 | 1 | 1 | 1 |
| Virtual Outdoor building | 1 | 1 | 1 | 1 | 1 |

TABLE 4-continued

| Another example of values in Avalaibility_building_vector | | | | | |
|---|---|---|---|---|---|
| Measurement | 1 | 2 | 3 | 4 | 5 |
| Building 3 | 1 | 0 | 1 | 1 | 0 |
| Building 4 | 1 | 0 | 1 | 1 | 1 |
| Building 2 | 1 | 1 | 1 | 1 | 1 |

From the values in Table 3 and Table 4 and using Equation 1 (N=5), the likelihood values are as follows: Building 1=0.4; Virtual outdoor building=0.14; Building 3=0.14; Building 4=0.1; and Building 2=0.42. Hence, it can be estimated that the user was in Building 2.

In accordance with an embodiment, a smallest difference between the measured signal strength value of an access point and the signal strength measurement values of that access point associated with the measurement points of a radio map may be used instead of the sum of the differences to obtain the likelihood value.

There may be situations in which the device 300 is able to receive signals from access points from more than one building. Therefore, the device 300 may also use radio maps associated with two or more buildings in the determination of the location of the device 300 (inside or outside).

In an embodiment separate likelihood values for different buildings may not be calculated but one normalized likelihood value of position at all possible buildings, floors and outdoor areas where respective signal strength measurement can be observed may be calculated. When such likelihood is calculated the point where likelihood achieves its maximum may determine building, floor and horizontal position.

Figure 10B:
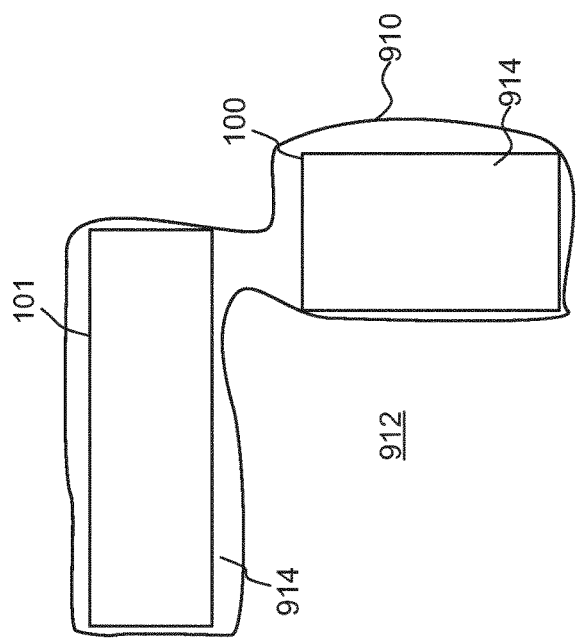
FIGS. 10a and 10b illustrate examples of indoor areas and outdoor areas associated with two buildings.
Figure 10A:
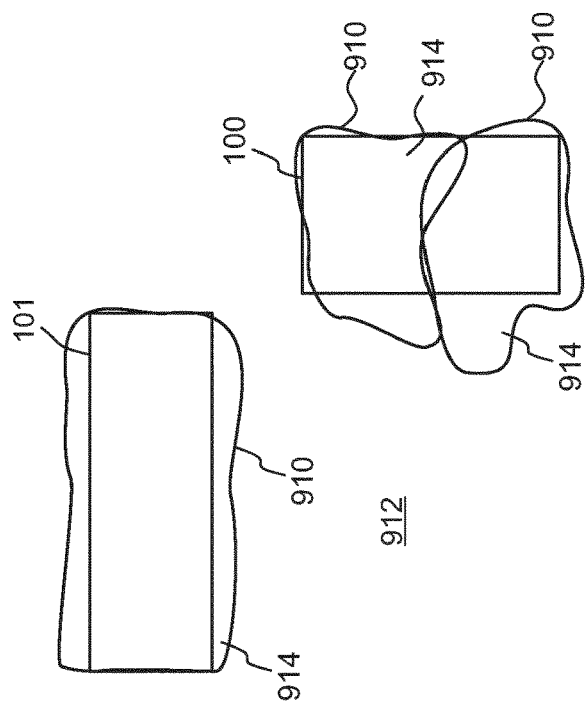

It should be noted that the indoor areas and outdoor areas indicated by radio maps need not exactly correspond with the real borders of physical buildings but the boundaries may be artificial. For example, a physical building might be represented e.g. by two or more indoor areas. Furthermore, the indoor area of a building may also be a combination of two or more buildings in proximity of each other. Hence, it may happen that although the device 300 is actually outside of those buildings, the determination may provide an indication that the device is indoors. These are illustrated in FIGS. 10a and 10b, in which two buildings 100, 101 are depicted. The line 910 depicts a virtual border between outdoors area 912 and indoors areas 914. In the example of FIG. 10a, the buildings 100, 101 are represented by two indoor areas, and in the example of FIG. 10b, the buildings 100, 101 are covered by one indoor area. Hence, the term building used in this specification need not correspond with actual building but it may be regarded as a virtual building. Respectively, the outdoor area may also be called as a virtual outdoor building in this specification.

The determined information of whether the device 300 is inside a virtual building (inside an indoor area) or outdoors (in virtual outdoor building) may be provided to location determination element 314, which may be part of the device 300 or an external device or service. The location determination element 314 may then decide whether to use e.g. a satellite based positioning, network based positioning etc., or indoor positioning, such as positioning methods based on wlan access points, Bluetooth® beacons etc., or both. For example, if it is determined that the device 300 is outdoors, the satellite based positioning may be used.

If it is determined that the device 300 is inside a building, the location determination element 314 may switch off possible satellite based positioning equipment, which may reduce the power consumption of the device 300.

In some situations, even if the device 300 is inside a building, the structure of the building may allow to use satellite based positioning. This may be the case e.g. if the device is a glass-covered corridor between two buildings. Hence, the radio map for the corridor may have been formed in such a way that the corridor is marked to represent outdoor space (i.e. the virtual outdoor building).

By collecting radio measurements in buildings and associated outdoor buildings, user state inside or outside the building may be determined effectively and may improve seamless handover between outdoor positioning technologies and indoor positioning technologies.

To utilize the above principles of inside/outside building detection the device 300 need not have any prior information of its location but the detection may be based on radio maps and identities of access points. Furthermore, the exact location of the access points is not needed either, when the radio maps are based on actual signal measurements and the locations of the measurements are known at some accuracy.

The device 300 may, however, have information regarding the current location at some accuracy, for example on the basis of GPS positioning and/or cellular based positioning. The device 300 may also have information on whether one or more radio maps exist for the environment or the device 300 may communicate with the server 105 to obtain the radio map(s) created for the environment. This may be deduced e.g. on the basis of the current geolocation of the device or on the basis of identity information of the access point(s) 103 from which the device 300 is able to receive signals.

In accordance with an embodiment, some or all of the calculations explained above may also be performed outside the device 300, for example by the server 105. Hence, the device 300 sends the signal strength measurements e.g. to the server 105. The server 105 may then send the determined location (indoor/outdoor) to the device 300 which may utilize this information in further processing as if the determination were made by the device 300.

Correspondingly, a so called cloud may also be utilized in the determination of the location of the device 300. Such cloud may comprise storage equipment for storing radio maps, calculation equipment for performing some or all of the calculations explained above, communication equipment to enable information transfer between different elements of the cloud and the device 300, etc.

In accordance with an embodiment, some or all of the measurements may be performed in the other way around, i.e. one or more of the access points may measure the signal strength of the device 300 and send this information to the server 105, if the indoor/outdoor determination is performed by the server 105, or to the device 300, if the indoor/outdoor determination is performed by the device 300. These measurement results may reveal which access points can receive signals transmitted by the device 300, wherein they provide similar information than the measurements performed by the device 300.

The indoor/outdoor detection method may increase the accuracy of the positioning of a user as best technologies may be selected/fused for providing positioning of a user. Also quite smooth transition from one building to another, by detection user presence in outdoor GNSS estimated may be fused for transition period. Crowd-sourced measurement data may be allocated on the correct building even if the building information was completely missing in the observations, if a radio map of sufficient quality already exists for the building.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

As described above, FIG. 9 is an example flowchart of a method according to an example embodiments. It will be understood that each block of the flowchart, and combinations of blocks in the flowchart, may be implemented by various means, such as hardware, firmware, processor, circuitry and/or other device associated with execution of software including one or more computer program instructions.

For example, one or more of the procedures described above may be embodied by computer program instructions. In this regard, the computer program instructions which embody the procedures described above may be stored by a memory device 318 of an apparatus 300 employing an embodiment of the present invention and executed by a processor 316 in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart blocks.

These computer program instructions may also be stored in a non-transitory computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 9, when executed, convert a computer or processing circuitry into a particular machine configured to perform an example embodiment of the present invention.

Accordingly, the operations of FIG. 9 define an algorithm for configuring a computer or processing circuitry (e.g., processor) to perform an example embodiment. In some cases, a general purpose computer may be configured to perform the functions shown in FIG. 9 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flow- charts, can be implemented by special purpose hardware-based computer systems which perform the specified functions or operations, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising at least one processor, and memory including computer program code, the memory and the computer program code configured to, with the at least one processor, cause the apparatus to perform at least the following:
   obtain information of signal strength of one or more wireless signals by a device;
   obtain information of signal strength distribution of wireless signals;
   use the information of signal strength and the information of signal strength distribution to determine likelihoods for the device being inside an area by determining a first likelihood that the device is in an indoors area and determining a second likelihood that the device is in an outdoors area; and
   conclude that the device is one of indoors or outdoors based upon a relationship between the first likelihood and the second likelihood, wherein the apparatus is caused to conclude that the device is one of indoors or outdoors by:
      concluding that the device is indoors, if the first likelihood is greater than the second likelihood, and
      concluding that the device is outdoors, if the second likelihood is greater than the first likelihood.

2. The apparatus according to claim 1, the indoor area covering two or more buildings, wherein said memory including computer program code, which when executed by the at least one processor, cause the apparatus to:
   determine in which building the device is, if it was concluded that the device is indoors.

3. The apparatus according to claim 1, said memory including computer program code, which when executed by the at least one processor, cause the apparatus to:
   obtain information of identities of the one or more access points; and
   use the identities to find out one or more radio maps which comprise information of signal strength distribution of the one or more access points.

4. The apparatus according to claim 3, wherein the radio maps comprise information on a plurality of signal strength measurements.

5. The apparatus according to claim 3, said memory including computer program code, which when executed by the at least one processor, cause the apparatus to:
   examine if the radio map is stored in the device; and request the radio map from a server, if the examination reveals that the radio map is not stored in the device.

6. The apparatus according to claim 1, wherein the wireless signal is one of WLAN signal, Bluetooth signal, Bluetooth low energy signal, cellular signal, Pseudolite signal and DigitalTV signal.

7. The apparatus according to claim 1, wherein the area is formed from one or more buildings forming an indoor area.

8. The apparatus according to claim 7, wherein a radio map is formed for each floor of the one or more buildings.

9. The apparatus according to claim 1, wherein it is incorporated in a mobile terminal.

10. The apparatus according to claim 7, wherein a radio map covers one or more buildings and a part of an outdoor area.

11. An apparatus comprising at least one processor and memory including computer program code, said memory and the computer program code, which when executed by the at least one processor, cause the apparatus to:
 obtain information of signal strength of one or more wireless signals by a device;
 obtain information of signal strength distribution of wireless signals; and
 use the information of signal strength and the information of signal strength distribution to determine at least one likelihood for the device being inside an area by:
  calculating for each one or more radio maps a sum of differences between the obtained signal strength of an access point and signal strength measurements of the radio map, wherein the one or more radio maps comprise information of signal strength distribution of one or more access points; and
  using the sum of differences to determine which radio map provides the greatest likelihood that the device is within the area represented by the radio map.

12. An apparatus comprising at least one processor and memory including computer program code, said memory and the computer program code, which when executed by the at least one processor, cause the apparatus to:
 obtain information of signal strength of one or more wireless signals by a device;
 obtain information of signal strength distribution of wireless signals; and
 use the information of signal strength and the information of signal strength distribution to determine at least one likelihood for the device being inside an area by:
  comparing the obtained signal strength with signal strength measurements of the radio map;
  using location information associated with the signal strength measurement of the radio map which is closest to the obtained signal strength as an assumed location of the device; and
  determining a likelihood that the assumed location corresponds with the actual location of the device.

13. A method comprising:
 obtaining information of signal strength of one or more wireless signals by a device;
 obtaining information of signal strength distribution of wireless signals;
 using the information of signal strength and the information of signal strength distribution to determine likelihoods for the device being inside an area by determining a first likelihood that the device is in an indoors area and determining a second likelihood that the device is in an outdoors area; and
 concluding that the device is one of indoors or outdoors based upon a relationship between the first likelihood and the second likelihood, wherein concluding that the device is one of indoors or outdoors comprises:
  concluding that the device is indoors, if the first likelihood is greater than the second likelihood, and
  concluding that the device is outdoors, if the second likelihood is greater than the first likelihood.

14. A computer program product embodied on a non-transitory computer readable medium, comprising computer program code configured to, when executed on at least one processor, cause an apparatus or a system to:
 obtain information of signal strength of one or more wireless signals by a device; obtain information of signal strength distribution of wireless signals;
 use the information of signal strength and the information of signal strength distribution to determine likelihoods for the device being inside an area by determining a first likelihood that the device is in an indoors area and determining a second likelihood that the device is in an outdoors area; and
 conclude that the device is one of indoors or outdoors based upon a relationship between the first likelihood and the second likelihood, wherein the apparatus or the system is caused to conclude that the device is one of indoors or outdoors by:
  concluding that the device is indoors, if the first likelihood is greater than the second likelihood, and
  concluding that the device is outdoors, if the second likelihood is greater than the first likelihood.

15. The method according to claim 13, the indoor area covering two or more buildings, wherein the method further comprises:
 determining in which building the device is, if it was concluded that the device is indoors.

16. The method according to claim 13, further comprising:
 obtaining information of identities of the one or more access points; and
 using the identities to find out one or more radio maps which comprise information of signal strength distribution of the one or more access points.

17. The method according to claim 16, wherein the radio maps comprise information on a plurality of signal strength measurements.

18. A method comprising:
 obtaining information of signal strength of one or more wireless signals by a device;
 obtaining information of signal strength distribution of wireless signals; and
 using the information of signal strength and the information of signal strength distribution to determine at least one likelihood for the device being inside an area by:
  calculating for each of one or more radio maps a sum of differences between the obtained signal strength of an access point and signal strength measurements of the radio map, wherein the one or more radio maps comprise information of signal strength distribution of one or more access points; and
  using the sum of differences to determine which radio map provides the greatest likelihood that the device is within the area represented by the radio map.

19. A method comprising:
 obtaining information of signal strength of one or more wireless signals by a device;
 obtaining information of signal strength distribution of wireless signals; and using the information of signal strength and the information of signal strength distribution to determine at least one likelihood for the device being inside an area by:
comparing the obtained signal strength with signal strength measurements of the radio map;
using location information associated with the signal strength measurement of the radio map which is closest to the obtained signal strength as an assumed location of the device; and
determining a likelihood that the assumed location corresponds with the actual location of the device.

20. A computer program product embodied on a non-transitory computer readable medium, comprising computer program code configured to, when executed on at least one processor, cause an apparatus or a system to:
obtain information of signal strength of one or more wireless signals by a device;
obtain information of signal strength distribution of wireless signals; and
use the information of signal strength and the information of signal strength distribution to determine at least one likelihood for the device being inside an area by:
calculating for each one or more radio maps a sum of differences between the obtained signal strength of an access point and signal strength measurements of the radio map, wherein the one or more radio maps comprise information of signal strength distribution of one or more access points; and
using the sum of differences to determine which radio map provides the greatest likelihood that the device is within the area represented by the radio map.

21. A computer program product embodied on a non-transitory computer readable medium, comprising computer program code configured to, when executed on at least one processor, cause an apparatus or a system to:
obtain information of signal strength of one or more wireless signals by a device;
obtain information of signal strength distribution of wireless signals; and
use the information of signal strength and the information of signal strength distribution to determine at least one likelihood for the device being inside an area by:
comparing the obtained signal strength with signal strength measurements of the radio map;
using location information associated with the signal strength measurement of the radio map which is closest to the obtained signal strength as an assumed location of the device; and
determining a likelihood that the assumed location corresponds with the actual location of the device.

* * * * *